United States Patent Office 2,760,230
Patented Aug. 28, 1956

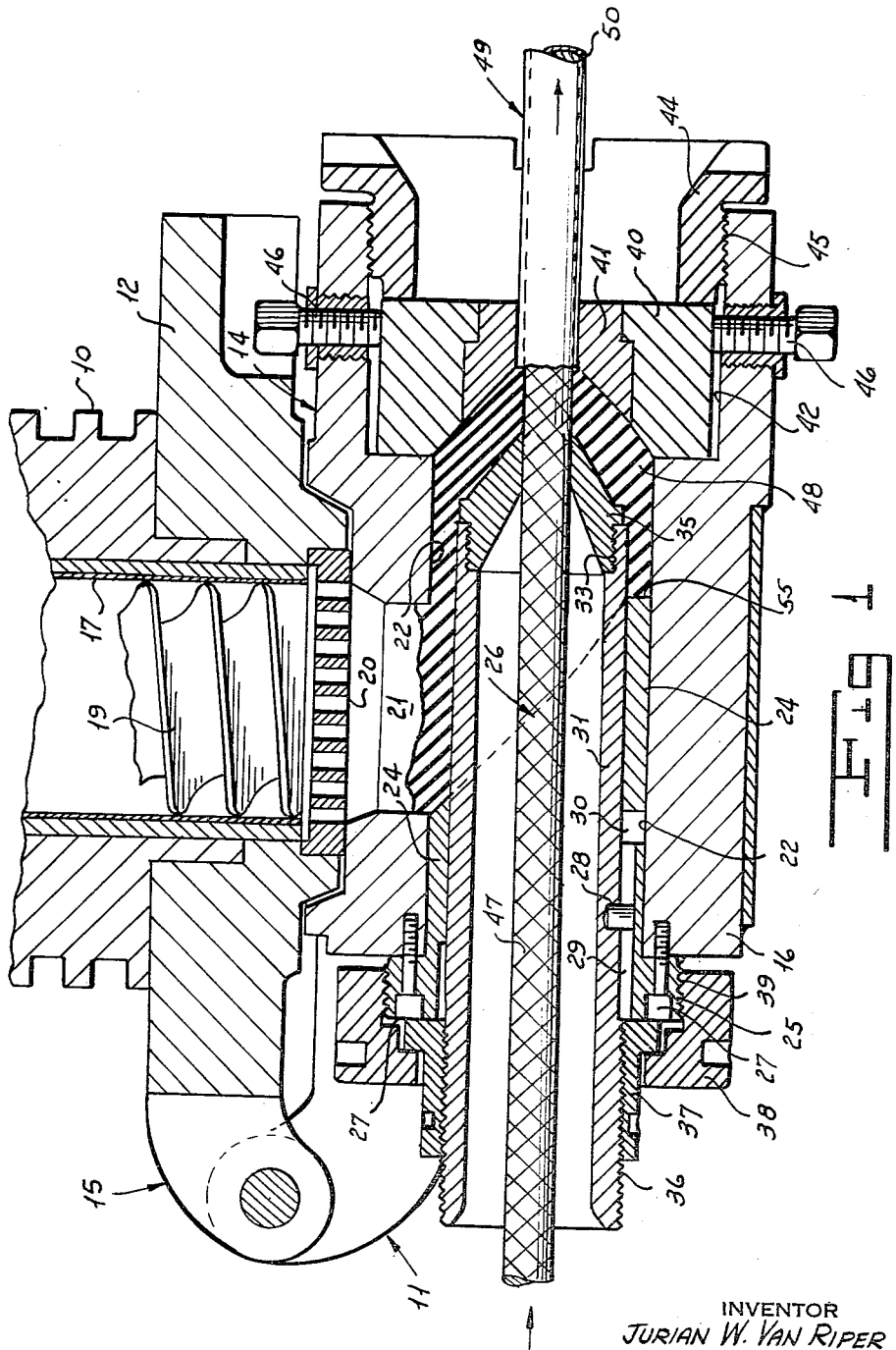

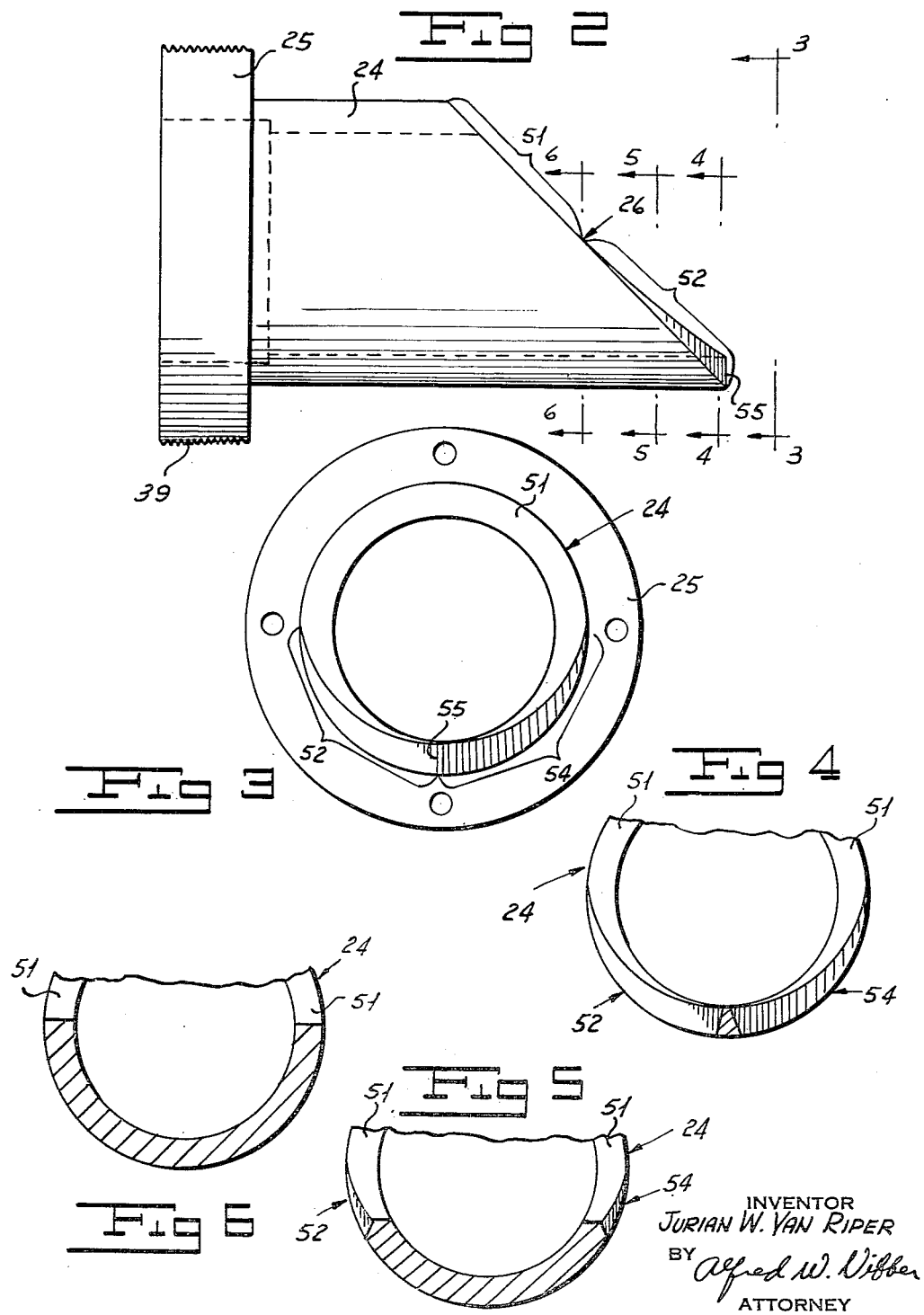

2,760,230

PLASTIC MATERIAL EXTRUSION HEAD

Jurian W. Van Riper, Ridgewood, N. J.

Application July 5, 1955, Serial No. 519,908

7 Claims. (Cl. 18—13)

This invention relates to an extrusion head for plastic material extruding apparatus, and more particularly to a cross-head for extruding plastic material in continuous lengths.

Typical of the extrusion operations in which the extrusion head of the invention is of advantage is that in which a core such as a cable is fed through the head and during its travel therethrough is provided with a continuous sheath or coating of plastic material. In such apparatus it is uusal, for reasons of convenience of design, to dispose the extrusion head transversely to the plastic material plasticizing and delivering means such as an extrusion barrel and screw arrangement. As a result, the plastic material flowing from the extrusion barrel must make a right angle turn as it travels into the cross-head to flow around the core guide, the core itself, and finally to travel outwardly through the plastic material-shaping die in the form of a sheath on the core.

Such type of extrusion head inevitably requires different particles of the plastic material to travel different lengths as the material leaves the first path, in the delivery means, and finally flows in a second path, generally at right angles to the first path, longitudinally in the cross-head. The thus treated plastic material, being under high pressure, acts somewhat as a liquid of a viscous nature, and thus tends to take the path of least resistance, which is around the inner corner of the zone of the intersection of the plastic delivering passage and the chamber in the cross-head. Consequently, in conventional extrusion heads extending transversely to the path of delivery of plastic material thereto, herein termed "cross-heads," there is a marked tendency for the plastic material to flow in greater amounts in that portion circumferentially of the head closer to the delivery end of the barrel. Such prior cross-heads, therefore, tend to produce a sheathed product or a hollow tubular product in which the thickness of the sheath or tube, as the case may be, is thicker in that portion of its cross-sectional area which lies closer to the plastic delivering barrel of the machine. Further, in prior conventional plastic material extruding cross-heads, there is a marked tendency for the plastic material to stagnate in that portion of the passage in the cross-head which is furthest from the delivery means. Such stagnant plastic material tends eventually to become hard or at least semi-hard, so that it may form scores or scratches in the portion of the sheath or other extruded plastic product which travels past it, such deformation of the sheath frequently remaining in the final product.

Among the objects of the invention is to provide an improved conveying means for plastic material being forwarded under pressure, of the type wherein the plastic material must be diverted through an angle on the order of a right angle in its travel therethrough, whereby all portions of the plastic material tend to move smoothly. Still another object of the invention resides in the provision of an extrusion cross-head for a plastic material extruding machine, said cross-head incorporating a novel plastic material guiding means whereby resistance to turning of the plastic material from its first path of delivery into the path of its travel through the die is markedly decreased and the plastic material tends to travel through the die at a uniform rate circumferentially of the die passage. Yet another object of the invention, in one specific embodiment thereof, lies in the provision of an improved cross-head for a core-sheathing plastic material extruding machine, wherein the core guide is supported by a sleeve-like member having a plastic material guiding end surface of a novel improved confiuration whereby the speed of travel of the plastic material in various locations circumferentially of the die is substantially uniform and the thickness of the sheath on the core is substantially constant.

The above and further objects of the invention relating to economies of use and manufacture will be more apparent in the following description of a preferred embodiment of the invention.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 1 is a fragmentary view in horizontal section through the cross-head and a portion of the extruding machine barrel of the apparatus of the invention.

Fig. 2 is a view in side elevation of the sleeve-like core guide supporting and plastic material diverting member of the apparatus.

Fig. 3 is a view in end elevation of such sleeve-like core guide supporting member, the view being taken from the line 3—3 of Fig. 2.

Figs. 4, 5, and 6 are views in vertical section through the sleeve-like core guide supporting member, the sections being taken along the lines 4—4, 5—5, and 6—6, respectively, of Fig. 2.

Although the apparatus of the invention is illustrated and described herein as a cross-head used to provide a continuous plastic sheath on a core such as a cable, it will be understood that, within its broadest aspects, the invention may also be used to advantage in the extrusion of hollow plastic shapes such as continuous tubes, and also in the extrusion of continuous solid shapes.

In the embodiment of the apparatus shown, plastic material is supplied by a conventional barrel and screw arrangement. The barrel of the extruding machine is shown fragmentarily at 10, the cross-head generally designated 11 being affixed to the outer end of the barrel. Specifically, the cross-head shown has a first fixed portion 12 bolted to the barrel and an active, sheathing portion 14 attached to portion 12 by a hinge 15 and adapted to be held in the operative position of Fig. 1 by studs, not shown.

Portion 14 of the head has a generally part-cylindrical member 16 having a longitudinally extending chamber in the form of a bore 22 therein disposed transversely to the passage 17 in the barrel 10. The axes of the passage and the chamber lie in a common horizontal plane. Plastic material 48 forwarded through the barrel by the rotary driven screw 19 passes under high pressure through the screen 20, through the converging frusto-conical passage 21 in the cross-head beyond the barrel 10, and thence into the chamber 22 in the cross-head.

Chamber 22 is provided with a first, outer tubular member 24 having an enlarged head 25 overlying the end of portion 16 of the head at the left of Fig. 1, and secured thereto by studs 27 extending through the head 25 into the member 16. Accurately and slidably fitting within the central bore in member 24 is the tubular core guiding member 31. Member 31 is held from turning with respect to member 24 by means of the radially disposed pin 28 mounted on member 31 and slidable in the groove 29 in member 24. Pin 28 may be mounted on member 31 when the two members are removed from bore 22 and the core guide 31 is slid within member 24 to align the pin receiving recess in the core guide with the radial hole 30 through member 24. The thus assembled members 24 and 31 are mounted in the bore 22 of the cross-head and are retained therein by the above described studs 27.

The end portion 35 of the core guide, having a central passage which guides the cable core 47, is mounted on the right hand end of member 31 by being screwed into the threaded counterbore 33 on the latter, as shown. The longitudinal position of member 35 within chamber 22 of the cross head may be adjusted, and members 31 and 35 held in adjusted position, by means of the first, flanged nut 37 screwed onto the externally threaded left hand end of member 31 and abutting the outer end of the head 25 of member 24, and by the second, flanged outer nut 38 screwed onto the thread 39 of head 25 and having its flanged portion overlying the inner flanged portion of the first nut 37.

The cross-head is provided at its right hand exit end with a die holder 40 supporting a die 41 for shaping the exterior of the sheath 50 of the sheathed cable 49. The die holder 40 is positioned in the counterbore 42 in the exit end of the cross-head, the counterbore being of somewhat larger diameter than the die holder. Lateral adjustment of the die holder and die is afforded by four radially directed studs spaced 90° apart around the axis of the counterbore. Two such studs 46 are shown in Fig. 1. The die holder is held in adjusted position on the cross-head by means of the internal nut 44 screwed into the threaded outer end of the counterbore 42 and abutting an outer annular zone at the end of the die holder.

The plastic material 48 forwarded through passage 21 in the cross-head flows around the right hand end of the tubular member 31 and thence to the right into the converging passage presented between the outer frusto-conical surface of member 35 and the confronting inner frusto-conical surface of the cross-head in advance of the die. In the first portion of such travel the plastic material is generally diverted from the first path, in the direction of passage 17 in barrel 10, into a second path, substantially at right angles thereto, along the outer surface of the member 31. The end surface 26 of the core guide supporting sleeve 24, at the end thereof in Fig. 1, both prevents travel of the plastic material to the left in the cross-head and, by reason of its novel configuration, decreases the resistance to the described change in the direction of flow of the plastic material and also tends to even out the rate of flow of the plastic material in the various locations circumferentially of the die, eliminating any tendency of stagnant portions to form in the plastic material.

The configuration of end surface 26 of member 24 will best be understood by consideration of Figs. 2–6, inclusive. As there shown, surface 26 is symmetrical with respect to the common horizontal plane containing the axis of barrel 10 and the axis of cross-head 16. The portion 51 of end surface 26 of member 24, lying closer to the delivery end of passage 17, is shown lying at the top in each of Figs. 2–6, inclusive. Portion 51 of end surface 26 lies in a vertical plane at approximately 45° with respect to the vertical axial plane of the chamber 22 of the cross-head. Portion 51 is generally one-half an annulus, that is, it extends generally over that half of surface 26 which is nearer the delivery end of the passage 17 through barrel 10. The remainder of the end surface 26 of member 24 is composed of the upper (as mounted in the machine) surface 52 and the lower surface 54. Surfaces 52 and 54, which are mirror images of each other, merge smoothly with the respective opposite ends of the plane surface 51 and join at the radial knife edge 55 which, as indicated in Fig. 1, is disposed in the horizontal plane containing the axis of barrel 10 and the axis of cross-head 16, and, in the embodiment shown, lies somewhat to the right of the projection of that side of passage 17 which is nearest the die.

Each of surfaces 52 and 54 is in the form of a right helicoid, that is, it is a surface developed by a radial generatrix as it moves along the axis of member 24. It has been found that with the rear end surface 26 of member 24 shown and described the resistance to turning of the plastic material from the first to the second path is markedly decreased over that existing in prior cross-heads of the same general type, and that it is possible by suitable initial adjustment of the die locating studs 46 to produce a sheathed product or a tube wherein the side wall thickness of the extruded plastic is substantially constant circumferentially of the product.

Whereas for purposes of illustration I have shown and described a preferred embodiment of the plastic material extrusion head of the invention, it will be understood that such embodiment is illustrative only since the extrusion head of the invention is capable of numerous variations as to details. The invention is, therefore, to be defined by the claims appended hereto.

I claim:

1. Plastic material handling mechanism comprising a chamber having a plastic material conducting passage therein which sharply diverts the plastic material at one location through an angle on the order of a right angle in its travel therethrough, means for forwarding the plastic material under high pressure through said passage, and means defining a plastic material diverting surface slanting across the outer corner of the path of travel of the material at said one location, the opposite sides of said surface in generally that half thereof further from the means for forwarding the material under pressure being generally mirror images of each other and being generally of right helicoidal shape.

2. In mechanism for extruding plastic material in continuous lengths having means including a passage for continuously delivering plastic material in a first path, and a cross-head disposed on the mechanism and having a chamber for receiving plastic material from the delivery means and forwarding it in a second path disposed substantially at a right angle to the first path, the improved head which comprises: a die for shaping the plastic material as it passes out of the cross-head, a member in the chamber diverting the plastic material toward the die as it passes through the chamber from the passage, the member having a plastic material guiding surface lying across the projection of the passage and generally slanting in a direction outwardly of the passage from the first side of the passage remote from the die to a location adjacent the projection of the second side of the passage nearer the die, the opposite sides of said plastic material guiding surface of the member in generally that half thereof further from the passage being generally mirror images of each other and being generally of right helicoidal shape.

3. In mechanism for extruding plastic material in continuous lengths having means including a passage for continuously delivering plastic material in a first path, and a cross-head disposed on the mechanism and having a chamber for receiving plastic material from the delivery means and forwarding it in a second path disposed substantially at a right angle to the first path, the improved head which comprises: a die for shaping the plastic material as it passes out of the cross-head, a central member in the chamber of the cross-head extending across the open end of the passage toward the die, and an annular member in the chamber surrounding the central member and diverting the plastic material toward the die as it passes through the chamber from the passage, the end surface of the annular member nearer the die lying across the projection of the passage and generally slanting in a direction outwardly of the passage from the first side of the passage remote from the die to a location adjacent the projection of the second side of the passage nearer the die, the opposite sides of said end surface of the annular member in generally that half of the annular member further from the passage being generally mirror images of each other and being generally of right helicoidal shape.

4. In mechanism for extruding plastic material in continuous lengths having means including a passage for continuously delivering plastic material in a first path, and a cross-head disposed on the mechanism and having a chamber for receiving plastic material from the delivery means and forwarding it in a second path disposed substantially at a right angle to the first path, the improved head which comprises: a die for shaping the plastic material as it passes out of the cross-head, a central member in the chamber of the cross-head extending longitudinally of the chamber and across the open end of the passage toward the die, and a sleeve in the chamber surrounding the central member and diverting the plastic material toward the die as it passes through the chamber from the passage, the end surface of the sleeve nearer the die lying across the projection of the passage and generally slanting in a direction outwardly of the passage from the first side of the passage remote from the die generally to the projection of the second side of the passage nearer the die, the opposite sides of said end surface of the sleeve in generally that half of the sleeve further from the passage being generally mirror images of each other and generally of right helicoidal shape, the two sides of said end surface of the sleeve nearer the die extending substantially to a central plane containing the axes of the sleeve and the passage.

5. In mechanism for extruding plastic material in continuous lengths having means including a passage for continuously delivering plastic material in a first path, and a cross-head disposed on the mechanism and having a chamber for receiving plastic material from the delivery means and forwarding it in a second path disposed substantially at a right angle to the first path, the improved head which comprises: a die for shaping the plastic material as it passes out of the cross-head, a central member in the chamber of the cross-head extending longitudinally of the chamber and across the open end of the passage toward the die, and a sleeve snugly fitting within the chamber and surrounding, supporting and centering the central member and diverting the plastic material toward the die as it passes through the chamber from the passage, the end surface of the sleeve nearer the die lying across the projection of the passage and generally slanting in a direction outwardly of the passage from the first side of the passage remote from the die at least to the projection of the second side of the passage nearer the die, the opposite sides of said end surface of the sleeve in generally that half of the sleeve further from the passage being generally mirror images of each other and generally of right helicoidal shape, the two sides of said end surface of the sleeve nearer the die extending substantially to a central plane containing the axes of the sleeve and the passage.

6. In mechanism for extruding plastic material in continuous lengths having means including a passage for continuously delivering plastic material in a first path, and a cross-head disposed on the mechanism and having a chamber for receiving plastic material from the delivery means and forwarding it in a second path disposed substantially at a right angle to the first path, the improved head which comprises: a die for shaping the plastic material as it passes out of the cross-head, a central member in the chamber of the cross-head extending longitudinally of the chamber and across the open end of the passage toward the die, and a sleeve in the chamber surrounding, supporting and centering the central member and diverting the plastic material toward the die as it passes through the chamber from the passage, the end surface of the sleeve nearer the die lying across the projection of the passage and generally slanting in a direction outwardly of the passage from the first side of the passage remote from the die to a location somewhat beyond the projection of the second side of the passage nearer the die, the opposite sides of said end surface of the sleeve in generally the first half of the sleeve nearer the passage lying generally in a transverse plane extending at an angle on the border of 45° with respect to the axis of the sleeve, the opposite sides of said end surface of the sleeve in generally the second half of the sleeve further from the passage being generally mirror images of each other and generally of right helicoidal shape, the surfaces of the two said halves of the end surface of the sleeve merging smoothly.

7. In mechanism for covering a continuous core with a sheath of plastic material having means including a passage for continuously delivering plastic material in a first path, and a core-receiving cross-head disposed on the mechanism and having a chamber for receiving plastic material from the delivery means and forwarding it in a second path disposed substantially at a right angle to the first path, the improved head which comprises: a die for shaping the sheath of plastic material on the core as it passes out of the cross-head, a central tubular core-guiding member in the chamber of the cross-head extending longitudinally of the chamber and across the open end of the passage toward the die, and a sleeve in the chamber surrounding, supporting and centering the core-guiding member and diverting the plastic material toward the die as it passes through the chamber from the passage, the end surface of the sleeve nearer the die lying across the projection of the passage and generally slanting in a direction outwardly of the passage from the first side of the passage remote from the die generally to a location adjacent the projection of the second side of the passage nearer the die, the opposite sides of said end surface of the sleeve in generally the first half of the sleeve nearer the passage lying generally in a transverse plane extending at an angle on the order of 45° with respect to the axis of the sleeve, the opposite sides of said end surface of the sleeve in generally the second half of the sleeve further from the passage being generally mirror images of each other and generally of right helicoidal shape, the surfaces of the two said halves of said end surface of the sleeve merging smoothly.

References Cited in the file of this patent

UNITED STATES PATENTS

| | | |
|---|---|---|
| 457,482 | Royle et al. | Aug. 11, 1891 |
| 515,951 | Cobb | Mar. 6, 1894 |
| 1,770,969 | Cherry | July 22, 1930 |
| 2,560,778 | Richardson et al. | July 17, 1951 |